United States Patent
Wu et al.

(10) Patent No.: US 12,149,169 B2
(45) Date of Patent: Nov. 19, 2024

(54) POWER CONVERTER HAVING MULTI-SLOPE COMPENSATION MECHANISM

(71) Applicant: ANPEC ELECTRONICS CORPORATION, Hsinchu (TW)

(72) Inventors: Cheng-Han Wu, Hsinchu (TW); Fu-Chuan Chen, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 273 days.

(21) Appl. No.: 17/969,809

(22) Filed: Oct. 20, 2022

(65) Prior Publication Data

US 2024/0072660 A1   Feb. 29, 2024

(30) Foreign Application Priority Data

Aug. 26, 2022   (TW) .................................. 111132175

(51) Int. Cl.
*H02M 3/156*   (2006.01)
*H02M 3/158*   (2006.01)

(52) U.S. Cl.
CPC ......... *H02M 3/1566* (2021.05); *H02M 3/158* (2013.01)

(58) Field of Classification Search
CPC .......................... H02M 3/1566; H02M 3/158
See application file for complete search history.

(56) References Cited

U.S. PATENT DOCUMENTS

| | | | | |
|---|---|---|---|---|
| 10,996,701 B1* | 5/2021 | Wu | .......................... | G05F 1/575 |
| 2015/0222181 A1* | 8/2015 | Coleman | ............... | H02M 3/156 |
| | | | | 323/288 |
| 2023/0336077 A1* | 10/2023 | Chen | ..................... | H02M 3/157 |
| 2024/0299736 A1* | 9/2024 | Bhadra | .............. | A61N 1/36125 |

* cited by examiner

*Primary Examiner* — Jue Zhang
*Assistant Examiner* — Lakaisha Jackson
(74) *Attorney, Agent, or Firm* — Li & Cai Intellectual Property (USA) Office

(57) ABSTRACT

A power converter having a multi-slope compensation mechanism is provided. A multi-slope compensation circuit of the power converter includes a plurality of first capacitors, a comparator and a plurality of first resistors. A first terminal of each of the plurality of first capacitors and a node between a second terminal of a high-side switch and a first terminal of a low-side switch are connected to an inductor. A plurality of first input terminals of a comparator are respectively connected to second terminals of the plurality of first capacitors, and are respectively connected to first terminals of the plurality of first resistors. Second terminals of the plurality of first resistors are coupled to a second reference voltage. A second input terminal of the comparator is coupled to a first reference voltage. An output terminal of the comparator is connected to an input terminal of a driver circuit.

20 Claims, 6 Drawing Sheets

POWER CONVERTER HAVING MULTI-SLOPE COMPENSATION MECHANISM

CROSS-REFERENCE TO RELATED PATENT APPLICATION

This application claims the benefit of priority to Taiwan Patent Application No. 111132175, filed on Aug. 26, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a multi-slope compensation mechanism.

BACKGROUND OF THE DISCLOSURE

A power converter can be used to convert an input voltage into an output voltage. The power converter can supply the output voltage to a load connected to the power converter as power required for operation of the load. However, when the load instantly transits from a light load to a heavy load, an output current that the power converter supplies to the load instantly increases. As a result, the output voltage of the power converter instantly undershoots to an excessively low voltage, which can cause circuit components of the power converter to be damaged. At this time, the output current that is supplied to the load by the power converter is insufficient for the operation of the load.

SUMMARY OF THE DISCLOSURE

In response to the above-referenced technical inadequacies, the present disclosure provides a power converter having a multi-slope compensation mechanism. The power converter includes a high-side switch, a low-side switch, a multi-slope compensation circuit and a driver circuit. A first terminal of the high-side switch is coupled to an input voltage. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. A second terminal of the inductor is connected to a first terminal of an output capacitor. A second terminal of the output capacitor is grounded. The multi-slope compensation circuit includes a plurality of first capacitors, a comparator, a plurality of first resistors and a second resistor. Each of the plurality of first capacitors has a first terminal and a second terminal. A plurality of first input terminals of the comparator are respectively connected to the second terminals of the plurality of first capacitors. A second input terminal of the comparator is coupled to a first reference voltage. First terminals of the plurality of first resistors are respectively connected to the plurality of first input terminals of the comparator. The first terminals of the plurality of first resistors are respectively connected to the second terminals of the plurality of first capacitors. A second terminal of each of the plurality of first resistors is coupled to a second reference voltage. A first terminal of the second resistor is connected to the first terminal of the inductor. A second terminal of the second resistor is connected to the first terminal of each of the plurality of first resistors. An input terminal of the driver circuit is connected to an output terminal of the comparator. An output terminal of the driver circuit is connected to a control terminal of the high-side switch and a control terminal of the low-side switch.

In certain embodiments, the multi-slope compensation circuit further includes a second capacitor. A first terminal of the second capacitor is connected to the second terminal of the inductor. A second terminal of the second capacitor is connected to the first terminal of each of the plurality of first capacitors.

In certain embodiments, the multi-slope compensation circuit further includes an error amplifier. A first input terminal of the error amplifier is connected to the second terminal of the inductor. A second input terminal of the error amplifier is coupled to a third reference voltage. An output terminal of the error amplifier is connected to the second input terminal of the comparator. A voltage of an output terminal of the error amplifier is the first reference voltage.

In certain embodiments, the power converter further includes a voltage driver circuit. An input terminal of the voltage driver circuit is connected to the second terminal of the inductor. An output terminal of the voltage driver circuit is connected to the first input terminal of the error amplifier.

In certain embodiments, the voltage driver circuit includes a first voltage driving resistor and a second voltage driving resistor. A first terminal of the first voltage driving resistor is connected to the second terminal of the inductor. A second terminal of the first voltage driving resistor is connected to a first terminal of the second voltage driving resistor. A node between the second terminal of the first voltage driving resistor and the first terminal of the second voltage driving resistor is connected to the first input terminal of the error amplifier. A second terminal of the second voltage driving resistor is grounded.

In certain embodiments, the second terminal of each of the plurality of first resistors is connected to the second terminal of the inductor, and a voltage of the second terminal of the inductor is the second reference voltage.

In certain embodiments, the power converter further includes a voltage driver circuit. An input terminal of the voltage driver circuit is connected to the second terminal of the inductor. An output terminal of the voltage driver circuits is connected to the second terminal of each of the plurality of first resistors.

In certain embodiments, the voltage driver circuit includes a first voltage driving resistor and a second voltage driving resistor. A first terminal of the first voltage driving resistor is connected to the second terminal of the inductor. A second terminal of the first voltage driving resistor is connected to a first terminal of the second voltage driving resistor. A node between the second terminal of the first voltage driving resistor and the first terminal of the second voltage driving resistor is connected to the second terminal of each of the plurality of first resistors. A second terminal of the second voltage driving resistor is grounded. A voltage of the first terminal of the second voltage driving resistor is the second reference voltage.

In certain embodiments, the second input terminal of the comparator is connected to the second terminal of the inductor, and a voltage of the second terminal of the inductor is the first reference voltage.

In certain embodiments, the power converter further includes a voltage driver circuit. An input terminal of the voltage driver circuit is connected to the second terminal of the inductor. An output terminal of the voltage driver circuits is connected to the second input terminal of the comparator.

In certain embodiments, the voltage driver circuit includes a first voltage driving resistor and a second voltage driving resistor. A first terminal of the first voltage driving resistor is connected to the second terminal of the inductor. A second terminal of the first voltage driving resistor is connected to a first terminal of the second voltage driving resistor. A node between the second terminal of the first voltage driving resistor and the first terminal of the second voltage driving resistor is connected to the second terminal of the second input terminal of the comparator. A second terminal of the second voltage driving resistor is grounded. A voltage of the first terminal of the second voltage driving resistor is the first reference voltage.

In certain embodiments, the driver circuit includes a conduction signal generator. The conduction signal generator is connected to the output terminal of the comparator, the control terminal of the high-side switch and the control terminal of the low-side switch. The conduction signal generator is configured to output a high-side conduction signal to the control terminal of the high-side switch. The conduction signal generator is configured to output a low-side conduction signal to the control terminal of the low-side switch according to a comparison signal from the comparator.

In certain embodiments, the driver circuit further includes a logic circuit. The logic circuit is connected to the conduction signal generator, the control terminal of the high-side switch and the control terminal of the low-side switch. The logic circuit is configured to output a first logic signal to the control terminal of the high-side switch according to the high-side conduction signal. The logic circuit is configured to output a second logic signal to the control terminal of the low-side switch according to the low-side conduction signal.

In certain embodiments, the driver circuit further includes a first buffer circuit. An input terminal of the first buffer circuit is connected to an output terminal of the logic circuit. An output terminal of the first buffer circuit is connected to the control terminal of the high-side switch.

In certain embodiments, the driver circuit further includes a second buffer circuit. An input terminal of the second buffer circuit is connected to the output terminal of the logic circuit. An output terminal of the second buffer circuit is connected to the control terminal of the low-side switch.

In another aspect, the present disclosure provides a power converter having a multi-slope compensation mechanism. The power converter includes a high-side switch, a low-side switch, a multi-slope compensation circuit and a driver circuit. A first terminal of the high-side switch is coupled to an input voltage. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. A second terminal of the inductor is connected to a first terminal of an output capacitor. A second terminal of the output capacitor is grounded. The multi-slope compensation circuit includes a first capacitor, a comparator, a plurality of first resistors and a second resistor. The first capacitor has a first terminal and a second terminal. The comparator has a plurality of first input terminals and a second input terminal. The second input terminal of the comparator is coupled to a first reference voltage. The first resistors are connected to each other in series. First terminals of the plurality of first resistors are respectively connected to the plurality of first input terminals of the comparator. One of the plurality of first resistors is further connected to the second terminal of the first capacitor. Another one of the plurality of first resistors is coupled to a second reference voltage. A second terminal of each of the plurality of first resistors except for the another one of the plurality of first resistors is connected to the first terminal of one of the plurality of first resistors that is disposed adjacent thereto. A first terminal of the second resistor is connected to the first terminal of the inductor. A second terminal of the second resistor is connected to the first terminal of the first capacitor. An input terminal of the driver circuit is connected to an output terminal of the comparator. An output terminal of the driver circuit is connected to a control terminal of the high-side switch and a control terminal of the low-side switch.

In certain embodiments, the multi-slope compensation circuit further includes a second capacitor. A first terminal of the second capacitor is connected to the second terminal of the inductor. A second terminal of the second capacitor is connected to the first terminal of the first capacitor.

In certain embodiments, the multi-slope compensation circuit further includes an error amplifier. A first input terminal of the error amplifier is connected to the second terminal of the inductor. A second input terminal of the error amplifier is coupled to a third reference voltage. An output terminal of the error amplifier is connected to the second input terminal of the comparator. A voltage of an output terminal of the error amplifier is the first reference voltage.

In certain embodiments, the power converter further includes a voltage driver circuit. An input terminal of the voltage driver circuit is connected to the second terminal of the inductor. An output terminal of the voltage driver circuit is connected to the first input terminal of the error amplifier.

In certain embodiments, the voltage driver circuit includes a first voltage driving resistor and a second voltage driving resistor. A first terminal of the first voltage driving resistor is connected to the second terminal of the inductor. A second terminal of the first voltage driving resistor is connected to a first terminal of the second voltage driving resistor. A node between the second terminal of the first voltage driving resistor and the first terminal of the second voltage driving resistor is connected to the first input terminal of the error amplifier. A second terminal of the second voltage driving resistor is grounded.

As described above, the present disclosure provides the power converter having the multi-slope compensation mechanism. The power converter of the present disclosure provides a plurality of ramp voltages. The power converter of the present disclosure selects one of the plurality of ramp voltages according to an instantaneous transient change in a load. The one of the plurality of ramp voltages is compared with a sensed voltage of the power converter of the present disclosure. As a result, the power converter of the present disclosure has good transient response. It is worth noting that, when the instantaneous transient change in the load and a current required for the load are larger, the comparator selects one of the plurality of ramp voltages that has a smaller amplitude. The comparator compares the one of the plurality of ramp voltages that has the smaller amplitude with the sensed voltage of the power converter to more quickly turn on the high-side switch. Therefore, an output voltage of the power converter that supplies power required for the load is more quickly increased, thereby effectively preventing the circuit components of the power converter of the present disclosure from being damaged due to undershooting of the output voltage of the power converter.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

Figure 1:
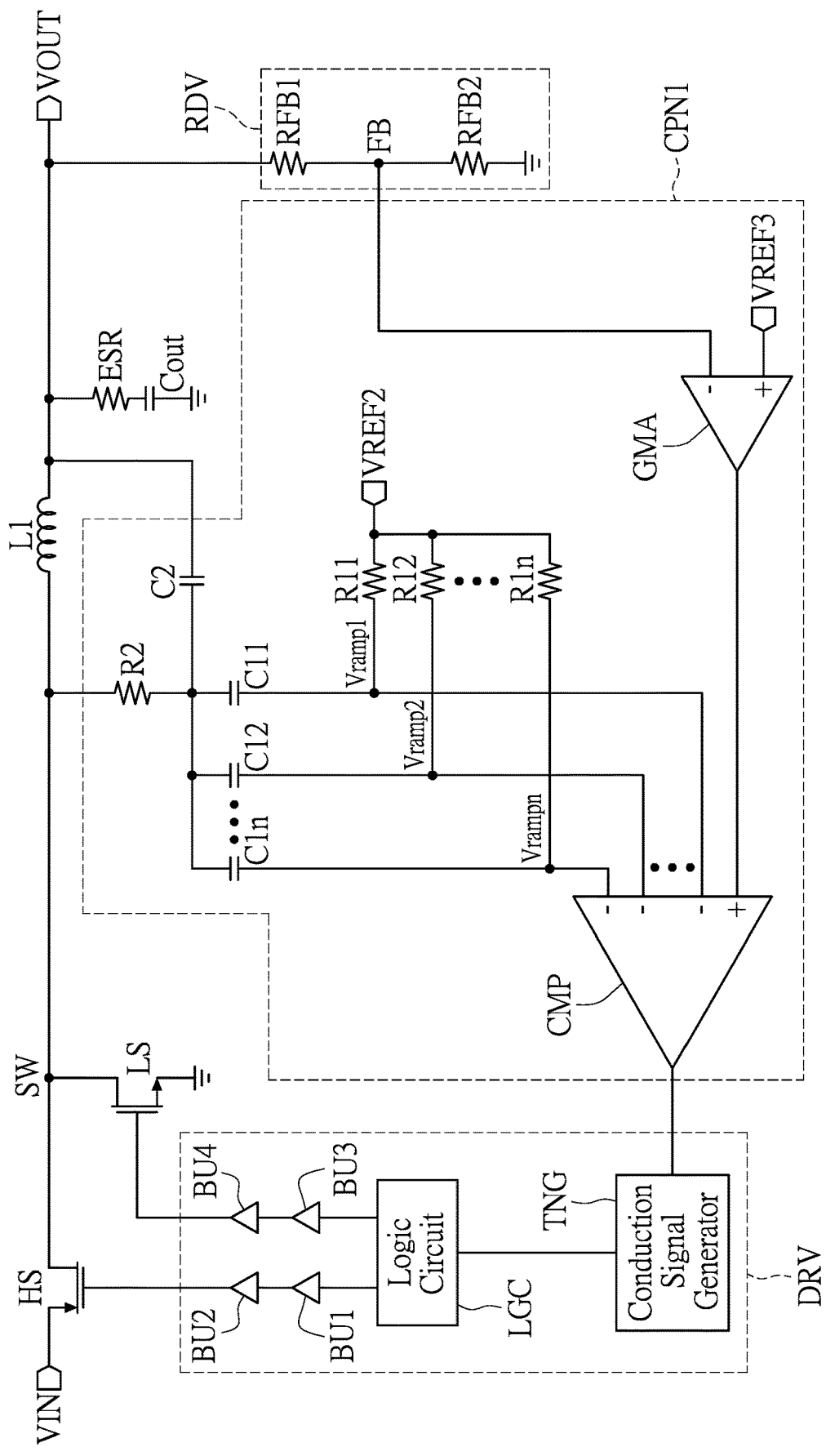
FIG. 1 is a circuit diagram of a power converter having a multi-slope compensation mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 4:
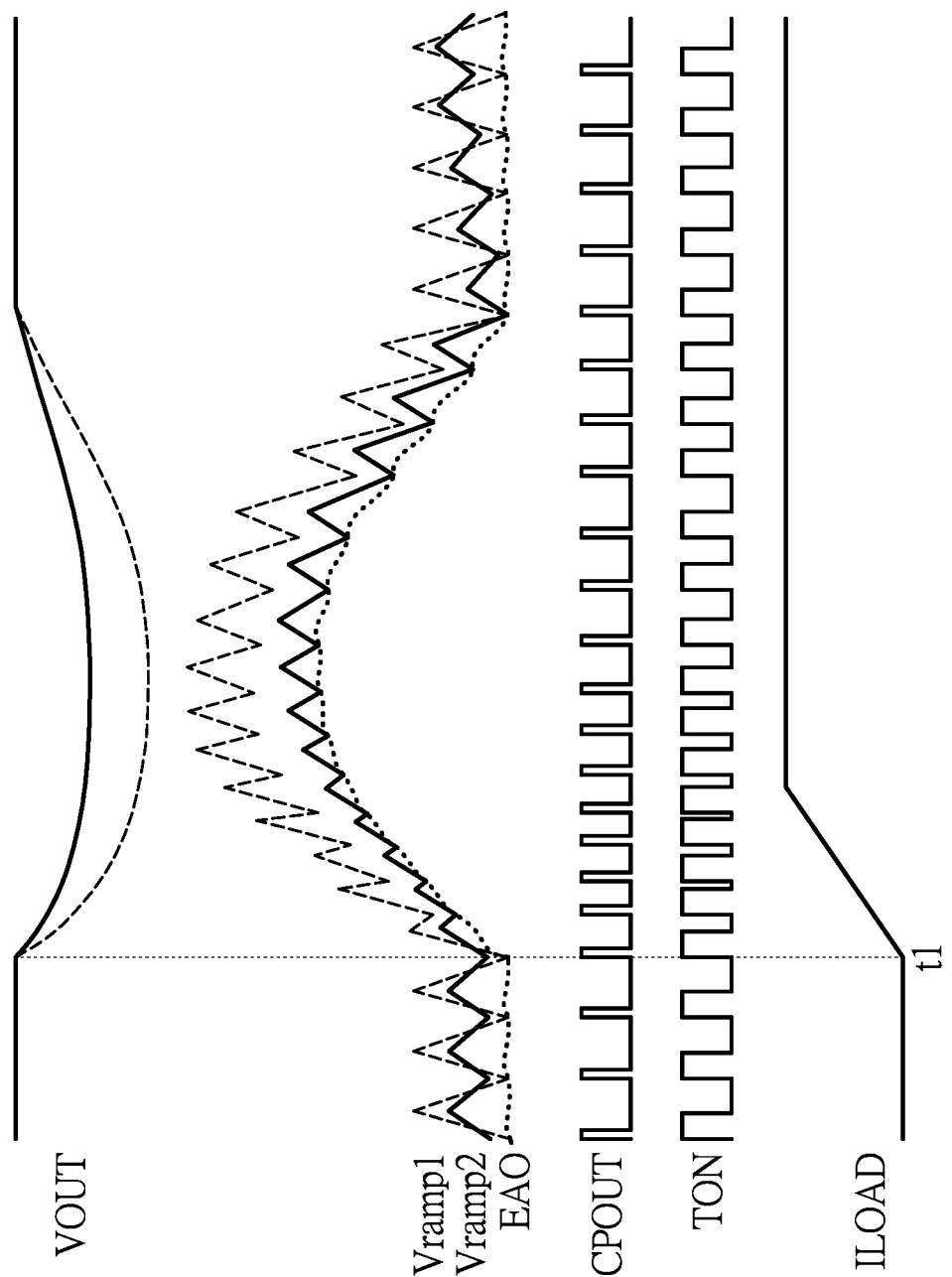
FIG. 4 is a waveform diagram of signals of the power converter having the multi-slope compensation mechanism according to the first embodiment of the present disclosure.
Figure 5:
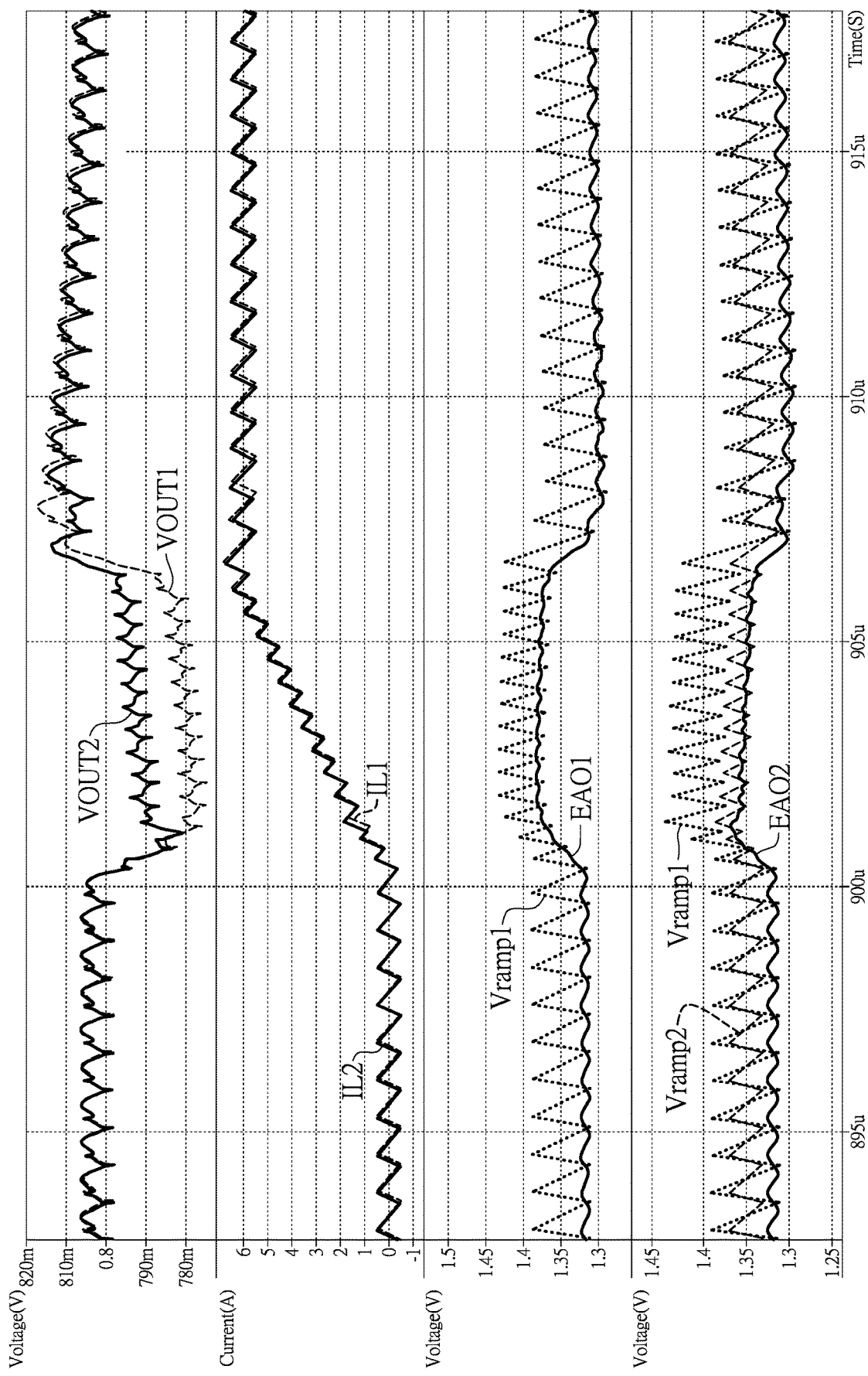
FIG. 5 is a waveform diagram of signals of the power converter having the multi-slope compensation mechanism according to the first embodiment of the present disclosure.

Reference is made to FIGS. 1 and 4, in which FIG. 1 is a circuit diagram of a power converter having a multi-slope compensation mechanism according to a first embodiment of the present disclosure, FIG. 4 is a waveform diagram of signals of the power converter having the multi-slope compensation mechanism according to the first embodiment of the present disclosure, and FIG. 5 is a waveform diagram of signals of the power converter having the multi-slope compensation mechanism according to the first embodiment of the present disclosure.

The power converter of the embodiment of the present disclosure may include a high-side switch HS, a low-side switch LS, a driver circuit DRV, an inductor L1 and an output capacitor Cout. It is worth noting that, the power converter of the embodiment of the present disclosure further includes a multi-slope compensation circuit CPN1. If necessary, the power converter of the embodiment of the present disclosure may further include a voltage driver circuit RDV.

A first terminal of the high-side switch HS is coupled to an input voltage VIN. A second terminal of the high-side switch HS is connected to a first terminal of the low-side switch LS. A second terminal of the low-side switch LS is grounded. A node between the first terminal of the low-side switch LS and the second terminal of the high-side switch HS is connected to a first terminal of the inductor L1. A second terminal of the inductor L1 is connected to a first terminal of (an equivalent series resistor ESR of) the output capacitor Cout.

A second terminal of the output capacitor Cout is grounded. A node between the second terminal of the inductor L1 and the first terminal of (the equivalent series resistor ESR of) the output capacitor Cout is an output terminal of the power converter. A voltage of the output terminal of the power converter is an output voltage VOUT.

An input terminal of the multi-slope compensation circuit CPN1 may be connected to the second terminal of the inductor L1 (through the voltage driver circuit RDV as shown in FIG. 1). An output terminal of the multi-slope compensation circuit CPN1 may be connected to an input terminal of the driver circuit DRV. An output terminal of the driver circuit DRV is connected to a control terminal of the high-side switch HS and a control terminal of the low-side switch LS.

The multi-slope compensation circuit CPN1 may output a compensation signal to the voltage driver circuit RDV, according to the output voltage VOUT or a divided voltage that is divided from the output voltage VOUT by the voltage driver circuit RDV. The driver circuit RDV may drive the high-side switch HS and the low-side switch LS according to the compensation signal from the multi-slope compensation circuit CPN1.

It is worth noting that, an multi-slope compensation circuit of the power converter of the embodiment of the present disclosure such as the multi-slope compensation circuit CPN1 may include a plurality of first capacitors C11 to Cn, a comparator CMP, a plurality of first resistors R11 to R1n, a second resistor R2 and a second capacitor C2 as shown in FIG. 1, but the present disclosure is not limited thereto.

A first terminal of each of the plurality of first resistors C11 to C1n is connected to a second terminal of the second resistor R2 and a second terminal of the second capacitor C2. A first terminal of the second resistor R2 is connected to the first terminal of the inductor L1. The first terminal of the second resistor R2 is further connected to a node SW between the second terminal of the high-side switch HS and the first terminal of the low-side switch LS. A first terminal of the second capacitor C2 is connected to the second terminal of the inductor L1.

A plurality of first input terminals such as inverting input terminals of the comparator CMP are respectively connected to second terminals of the plurality of first capacitors C11 to C1$n$, and are respectively connected to first terminals of the plurality of first resistors R11 to R1$n$. A second terminal of each of the plurality of first resistors R11 to R1$n$ is coupled to a second reference voltage VREF2.

A second input terminal such as a non-inverting input terminal of the comparator CMP may be coupled to a first reference voltage. If necessary, as shown in FIG. 1, the multi-slope compensation circuit CPN1 may further include an error amplifier GMA. The second input terminal such as the non-inverting input terminal of the comparator CMP is connected to an output terminal of the error amplifier GMA. A voltage of the output terminal of the error amplifier GMA is the first reference voltage.

A first input terminal such as an inverting input terminal of the error amplifier GMA may be directly connected to the second terminal of the inductor L1. Alternatively, the first input terminal such as the inverting input terminal of the error amplifier GMA may be connected to the second terminal of the inductor L1 through the driver circuit DRV as shown in FIG. 1. That is, as shown in FIG. 1, the input terminal of the driver circuit DRV is connected to the second terminal of the inductor L1, and the output terminal of the driver circuit DRV is connected to the first input terminal of the error amplifier GMA.

For example, as shown in FIG. 1, the driver circuit DRV may include a first voltage driving resistor RFB1 and a second voltage driving resistor RFB2. A first terminal of the first voltage driving resistor RFB1 is connected to the second terminal of the inductor L1. A second terminal of the first voltage driving resistor RFB1 is connected to a first terminal of the second voltage driving resistor RFB2. A second terminal of the second voltage driving resistor RFB2 is grounded. A node FB between the second terminal of the first voltage driving resistor RFB1 and the first terminal of the second voltage driving resistor RFB2 is connected to the first input terminal such as the inverting input terminal of the error amplifier GMA.

A second input terminal such as a non-inverting input terminal of the error amplifier GMA is coupled to a third reference voltage VREF3. The output terminal of the error amplifier GMA is connected to the second input terminal such as the non-inverting input terminal of the comparator CMP. An output terminal of the comparator CMP is connected to the input terminal of the driver circuit DRV.

For example, as shown in FIG. 1, the driver circuit DRV may include one or more of: a conduction signal generator TNG, a logic circuit LGC, a first buffer circuit (that may include a first buffer BU1 and a second buffer BU2), and a second buffer circuit (that may include a third buffer BU3 and a fourth buffer BU4), but the present disclosure is not limited thereto.

An input terminal of the conduction signal generator TNG of the driver circuit DRV is connected to the output terminal of the comparator CMP of the multi-slope compensation circuit CPN1. An output terminal of the conduction signal generator TNG may be connected to an input terminal of the logic circuit LGC.

An output terminal of the logic circuit LGC may be connected to an input terminal of (the first buffer BU1 of) the first buffer circuit. An output terminal of the first buffer BU1 may be connected to an input terminal of the second buffer BU2. An output terminal of (the second buffer BU2 of) the second buffer circuit may be connected to the control terminal of the high-side switch HS.

The output terminal of the logic circuit LGC may be further connected to an input terminal of (the third buffer BU3 of) the second buffer circuit. An output terminal of the third buffer BU3 may be connected to an input terminal of the fourth buffer BU4. An output terminal of (the fourth buffer BU4 of) the second buffer circuit may be connected to the control terminal of the low-side switch LS.

The first input terminal such as the inverting input terminal of the error amplifier GMA of the multi-slope compensation circuit CPN1 receives the output voltage VOUT from the second terminal of the inductor L1.

Alternatively, the first input terminal such as the inverting input terminal of the error amplifier GMA receives the divided voltage that is divided from the output voltage VOUT by the voltage driver circuit RDV. The divided voltage is a voltage of the node FB between the second terminal of the first voltage driving resistor RFB1 and the first terminal of the second voltage driving resistor RFB2.

The second input terminal of the error amplifier GMA may receive the third reference voltage VREF3.

The error amplifier GMA amplifies a difference between the output voltage VOUT and the third reference voltage VREF3 by a gain to output an error amplified signal. Alternatively, the error amplifier GMA amplifies a difference between the divided voltage of the output voltage VOUT (that is the voltage of the node FB) and the third reference voltage VREF3 by the gain to output the error amplified signal.

The plurality of first input terminals such as the inverting input terminals of the comparator CMP of the multi-slope compensation circuit CPN1 may receive a plurality of ramp voltages Vramp1 to Vramp$n$ (that are voltages of the first terminals of the plurality of first capacitors C11 to C1$n$). The second input terminal such the non-inverting terminal of the comparator CMP receives the error amplified signal from the error amplifier GMA.

The comparator CMP selects one of the plurality of ramp voltages Vramp1 to Vramp$n$, and compares the one of the plurality of ramp voltages Vramp1 to Vramp$n$ with a voltage of the error amplified signal to output a comparison signal. For example, as shown in FIG. 4, the comparator CMP selects one of the ramp voltages Vramp1 and Vramp2, and compares the one of the ramp voltages Vramp1 and Vramp2 with a voltage of the error amplified signal EAO to output a comparison signal CPOUT.

It is worth noting that, resistances of the plurality of first resistors R11 to R1$n$ of the multi-slope compensation circuit CPN1 may be different from each other, and capacitances of the plurality of first capacitors C11 to C1$n$ may be different from each other. As a result, the plurality of ramp voltages Vramp1 to Vramp$n$ are different from each other. As shown in FIG. 4, a voltage value of the ramp voltage Vramp2 is lower than a voltage value of the ramp voltage Vramp1, and an amplitude of a signal of the ramp voltage Vramp2 is lower than an amplitude of a signal of the ramp voltage Vramp1.

It should be understood that, the lower the amplitude of the signal of one of the plurality of ramp voltages Vramp1 to Vramp$n$ that is compared with the voltage of the error amplified signal by the comparator CMP is, the larger the frequency that pulse waves are generated in the comparison signal such as the comparison signal CPOUT as shown in FIG. 4 is.

When an instantaneous transient change in a load connected to the output terminal of the power converter and the power required for the load (such as a heavy load) are larger, the comparator CMP selects one of the plurality of ramp voltages Vramp1 to Vrampn that has a smaller amplitude. When the comparator CMP compares the one of the plurality of ramp voltages Vramp1 to Vrampn that has the smaller amplitude with the voltage of the error amplified signal, the comparator CMP more quickly outputs the pulse waves of the comparison signal. As a result, the driver circuit DRV more quickly turns on the high-side switch HS according to the pulse waves of the comparator CMP (at a high level). At this time, the input voltage VIN is more quickly provided to the output terminal of the power converter sequentially through the high-side switch HS being turned on and the inductor L1. Therefore, the output voltage VOUT of the output terminal of the power converter that supplies power required for the load is quickly increased, thereby effectively preventing the output voltage VOUT of the output terminal of the power converter from undershooting to an excessively low voltage.

As shown in FIG. 4, when a load current ILOAD that is supplied to the load by the output terminal of the power converter increases, the output voltage VOUT of the power converter decreases. Under this condition, the comparator CMP compares the voltage of the error amplified signal with the ramp voltage Vramp2 having the smaller amplitude to generate the pulse waves of the comparison signal CPOUT having a higher frequency. As a result, the driver circuit DRV turns on the high-side switch HS at a higher frequency according to the level such as the high level of the comparison signal CPOUT. Therefore, the output voltage VOUT of the output terminal of the power converter more quickly increases to provide the load current ILOAD sufficient for operation of load.

When the comparator CMP compares a voltage of an error amplified signal EAO1 with the ramp voltage Vramp1 having the larger amplitude, the power converter supplies an output voltage VOUT1 as shown in FIG. 5. At this time, a current of the inductor is an inductor current IL1 as shown in FIG. 5.

Conversely, when the comparator CMP compares a voltage of an error amplified signal EAO2 with the ramp voltage Vramp2 having the smaller amplitude, the power converter supplies an output voltage VOUT2 as shown in FIG. 5. At this time, the current of the inductor is an inductor current IL2 as shown in FIG. 5.

The undershooting of the output voltage VOUT2 is improved by 29% with respect to that of the output voltage VOUT1. It is apparent that, when the error amplified signal EAO2 is compared with the ramp voltage Vramp2 having the smaller amplitude, the undershooting of the output voltage VOUT2 of the power converter is effectively improved.

The comparator CMP may select one of the plurality of ramp voltages Vramp1 to Vrampn according to the instantaneous transient change in the load and the power required for the load. The comparator CMP may compare the one of the plurality of ramp voltages Vramp1 to Vrampn with the voltage of the error amplified signal to output the pulse waves of the comparison signal.

When the instantaneous transient change in the load and a current required for the load that is the heavy load are larger, the comparator CMP selects one of the plurality of ramp voltages Vramp1 to Vrampn that has the smaller amplitude (such as the ramp voltage Vramp2). The comparator CMP compares the one of the plurality of ramp voltages Vramp1 to Vrampn that has the smaller amplitude (such as the ramp voltage Vramp2) with the voltage of the error amplified signal to more quickly output the pulse waves of the comparison signal.

When the instantaneous transient change in the load and the current required for the load that is the light load or in a steady state are smaller, the comparator CMP selects one of the plurality of ramp voltages Vramp1 to Vrampn that has the larger amplitude (such as the ramp voltage Vramp1). The comparator CMP compares the one of the plurality of ramp voltages Vramp1 to Vrampn that has the larger amplitude (such as the ramp voltage Vramp1) with the voltage of the error amplified signal to stably output the pulse waves of the comparison signal.

After the comparator CMP outputs the comparison signal such as the comparison signal CPOUT as shown in FIG. 4, the conduction signal generator TNG of the driver circuit DRV determines a level of a high-side conduction signal and a level of a low-side conduction signal according to the level of the comparison signal from the comparator CMP. The conduction signal generator TNG outputs the high-side conduction signal and the low-side conduction signal.

The logic circuit LGC, according to the high-side conduction signal, outputs a first logic signal to the control terminal of the high-side switch HS through the first buffer BU1 and the second buffer BU2 of the first buffer circuit. The logic circuit LGC, according to the low-side conduction signal, outputs a second logic signal to the control terminal of the low-side switch LS through the third buffer BU3 and the fourth buffer BU4 of the second buffer circuit.

For example, when the high-side conduction signal such as a high-side conduction signal TON as shown in FIG. 4 is at a high level (and the low-side conduction signal is at a low level), the high-side switch HS is turned on and the low-side switch LS is turned off. Conversely, when the low-side conduction signal is at a high level (and the high-side conduction signal is at a low level), the low-side switch LS is turned on and the high-side switch HS is turned off.

Figure 2:
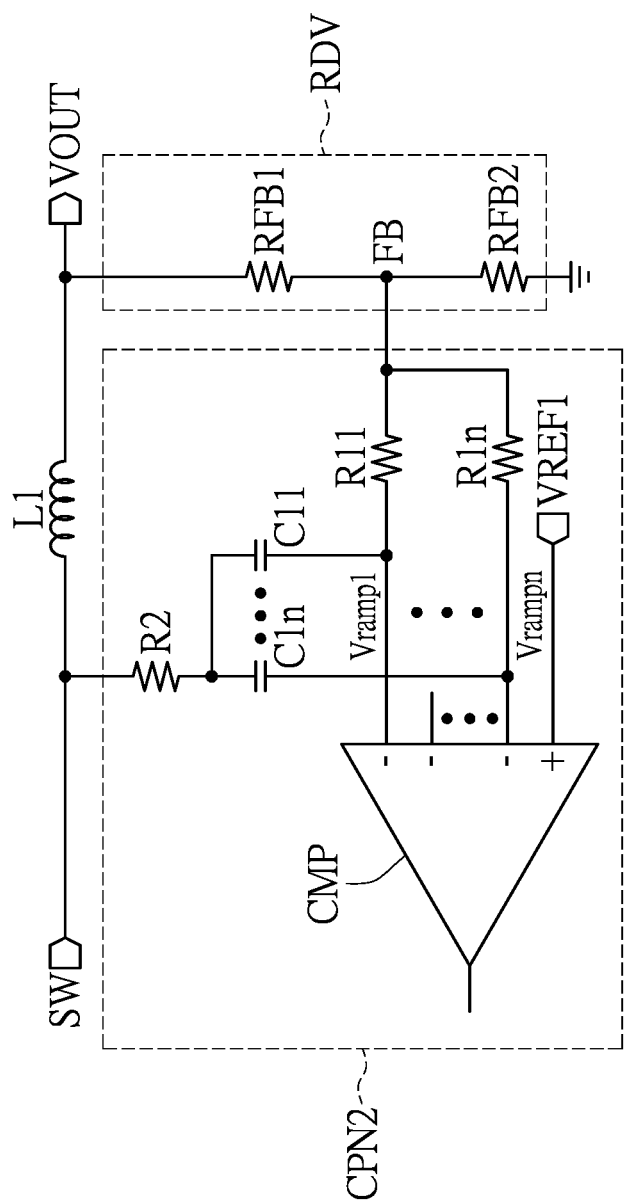
FIG. 2 is a circuit diagram of a multi-slope compensation circuit of a power converter having a multi-slope compensation mechanism according to a second embodiment of the present disclosure.

Reference is made to FIG. 2, which is a circuit diagram of a multi-slope compensation circuit of a power converter having a multi-slope compensation mechanism according to a second embodiment of the present disclosure.

The power converter of the embodiment of the present disclosure may include a multi-slope compensation circuit CPN2 as shown in FIG. 2. The multi-slope compensation circuit CPN1 as shown in FIG. 1 may be replaced with the multi-slope compensation circuit CPN2 as shown in FIG. 2.

As shown in FIG. 2, the multi-slope compensation circuit CPN2 of the embodiment of the present disclosure may include the plurality of first capacitors C11 to C1$n$, the comparator CMP, the plurality of first resistors R11 to R1$n$ and the second resistor R2.

The first terminal of each of the plurality of first capacitors C11 to C1$n$ is connected to the second terminal of the second resistor R2. The first terminal of the second resistor R2 is connected to the first terminal of the inductor L1. The first terminal of the second resistor R2 as shown in FIG. 2 may be connected to the node SW between the second terminal of the high-side switch HS and the first terminal of the low-side switch LS as shown in FIG. 1.

The plurality of first input terminals such as the inverting input terminals of the comparator CMP are respectively connected to the second terminals of the plurality of first capacitors C11 to C1$n$, and are respectively connected to the first terminals of the plurality of first resistors R11 to R1n. The second terminal of each of the plurality of first resistors R11 to R1n may be connected to the second terminal of the inductor L1 that is the output terminal of the power converter (through the driver circuit DRV).

For example, as shown in FIG. 2, the driver circuit DRV may include a first voltage driving resistor RFB1 and a second voltage driving resistor RFB2. The first terminal of the first voltage driving resistor RFB1 is connected to the second terminal of the inductor L1. The second terminal of the first voltage driving resistor RFB1 is connected to the first terminal of the second voltage driving resistor RFB2. The second terminal of the second voltage driving resistor RFB2 is grounded. The node FB between the second terminal of the first voltage driving resistor RFB1 and the first terminal of the second voltage driving resistor RFB2 is connected to the second terminal of each of the plurality of first resistors R11 to R1n.

The second input terminal such as the non-inverting input terminal of the comparator CMP may be coupled to a first reference voltage VREF1. The output terminal of the comparator CMP as shown in FIG. 2 may be connected to the input terminal of (the conduction signal generator TNG of) the driver circuit DRV as shown in FIG. 1.

The comparator CMP selects one of the plurality of ramp voltages Vramp1 to Vrampn, and compares the one of the plurality of ramp voltages Vramp1 to Vrampn with the first reference voltage VREF1 to output the comparison signal. The driver circuit DRV may drive the high-side switch HS and the low-side switch LS according to the comparison signal. For example, the driver circuit DRV may turn on the high-side switch HS and turn off the low-side switch LS, according to the high level of the comparison signal.

When the instantaneous transient change in the load and the current required for the load that is the heavy load are larger, the comparator CMP selects one of the plurality of ramp voltages Vramp1 to Vrampn that has the smaller amplitude. The comparator CMP compares the one of the plurality of ramp voltages Vramp1 to Vrampn that has the smaller amplitude with the first reference voltage Vref1 to more quickly output the pulse waves of the comparison signal. As a result, the output voltage VOUT of the output terminal of the power converter that supplies the power required for the load is more quickly increased, thereby effectively preventing the output voltage VOUT of the output terminal of the power converter from undershooting to the too low voltage.

Figure 3:
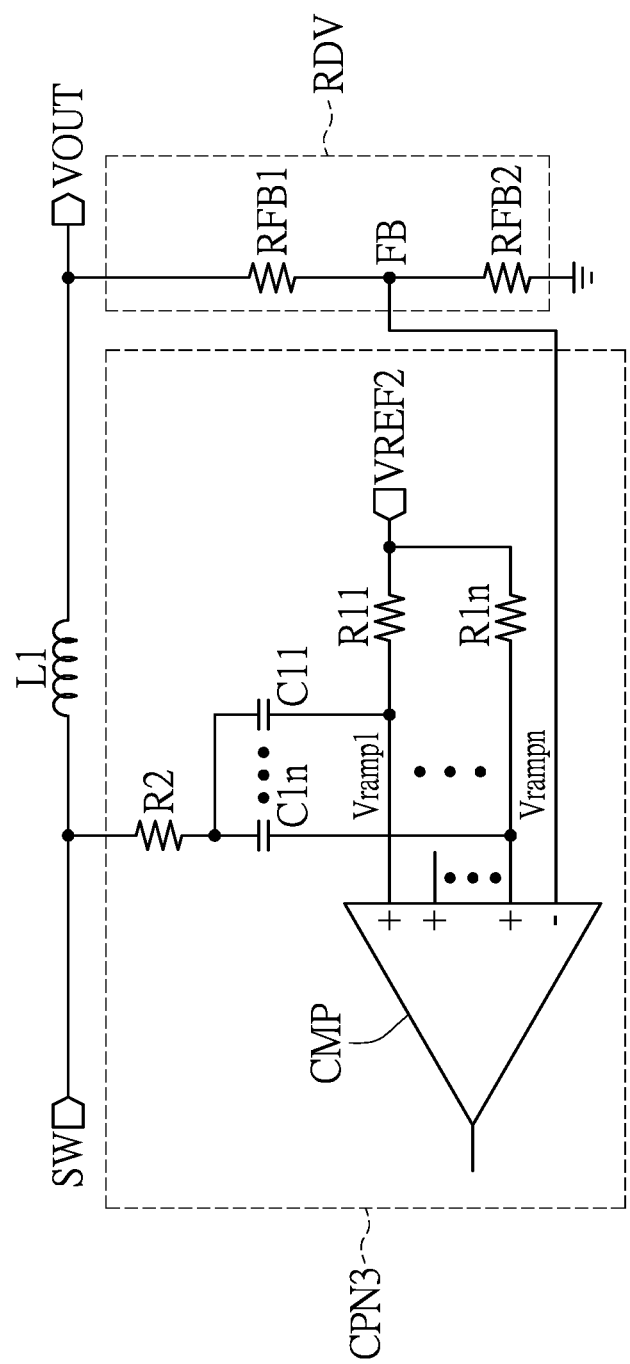
FIG. 3 is a circuit diagram of a multi-slope compensation circuit of a power converter having a multi-slope compensation mechanism according to a third embodiment of the present disclosure.

Reference is made to FIG. 3, which is a circuit diagram of a multi-slope compensation circuit of a power converter having a multi-slope compensation mechanism according to a third embodiment of the present disclosure.

The power converter of the embodiment of the present disclosure may include a multi-slope compensation circuit CPN3 as shown in FIG. 3. The multi-slope compensation circuit CPN1 as shown in FIG. 1 may be replaced with the multi-slope compensation circuit CPN3 as shown in FIG. 3.

The first terminal of each of the plurality of first capacitors C11 to C1n is connected to the second terminal of the second resistor R2. The first terminal of the second resistor R2 is connected to the first terminal of the inductor L1. The first terminal of the second resistor R2 as shown in FIG. 3 may be connected to the node SW between the second terminal of the high-side switch HS and the first terminal of the low-side switch LS as shown in FIG. 1.

The plurality of first input terminals such as the non-inverting input terminals of the comparator CMP are respectively connected to the second terminal of the plurality of first capacitors C11 to C1n, and are respectively connected to the first terminals of the plurality of first resistors R11 to R1n. The second terminal of each of the plurality of first resistors R11 to R1n is connected to the second reference voltage VREF2.

The second input terminal such as the inverting input terminal of the comparator CMP may be connected to the second terminal of the inductor L1 that is the output terminal of the power converter (through the voltage driver circuit RDV).

For example, as shown in FIG. 3, the voltage driver circuit RDV may include the first voltage driving resistor RFB1 and the second voltage driving resistor RFB2. The first terminal of the first voltage driving resistor RFB1 is connected to the second terminal of the inductor L1. The second terminal of the first voltage driving resistor RFB1 is connected to the first terminal of the second voltage driving resistor RFB2. The second terminal of the second voltage driving resistor RFB2 is grounded. The node FB between the second terminal of the first voltage driving resistor RFB1 and the first terminal of the second voltage driving resistor RFB2 may be connected to the second input terminal such as the inverting input terminal of the comparator CMP.

The output terminal of the comparator CMP as shown in FIG. 3 is connected to the input terminal of (the conduction signal generator TNG of) the driver circuit DRV as shown in FIG. 1.

The comparator CMP selects one of the plurality of ramp voltages Vramp1 to Vrampn. The comparator CMP compares the one of the plurality of ramp voltages Vramp1 to Vrampn with a voltage of the second terminal of the inductor L1 (that is the output voltage VOUT of the power converter) to output the comparison signal. Alternatively, the comparator CMP compares the one of the plurality of ramp voltages Vramp1 to Vrampn with the divided voltage of the voltage of the second terminal of the inductor L1 (that is the voltage of the node FB between the second terminal of the first voltage driving resistor RFB1 and the first terminal of the second voltage driving resistor RFB2) to output the comparison signal. The driver circuit DRV drives the high-side switch HS and the low-side switch LS according to the level of the comparison signal. For example, the driver circuit DRV turns on the high-side switch HS and turns off the low-side switch LS according to the low level of the comparison signal.

When the instantaneous transient change in the load and the current required for the load that is the heavy load are larger, the comparator CMP selects one of the plurality of ramp voltages Vramp1 to Vrampn that has the smaller amplitude. The comparator CMP compares the one of the plurality of ramp voltages Vramp1 to Vrampn that has the smaller amplitude with the output voltage VOUT or the divided voltage of the output voltage VOUT to more quickly output the pulse waves of the comparison signal. Therefore, the output voltage VOUT of the output terminal of the power converter that supplies the power required for the load is more quickly increased, thereby effectively preventing the output voltage VOUT of the output terminal of the power converter from undershooting to the too low voltage.

Figure 6:
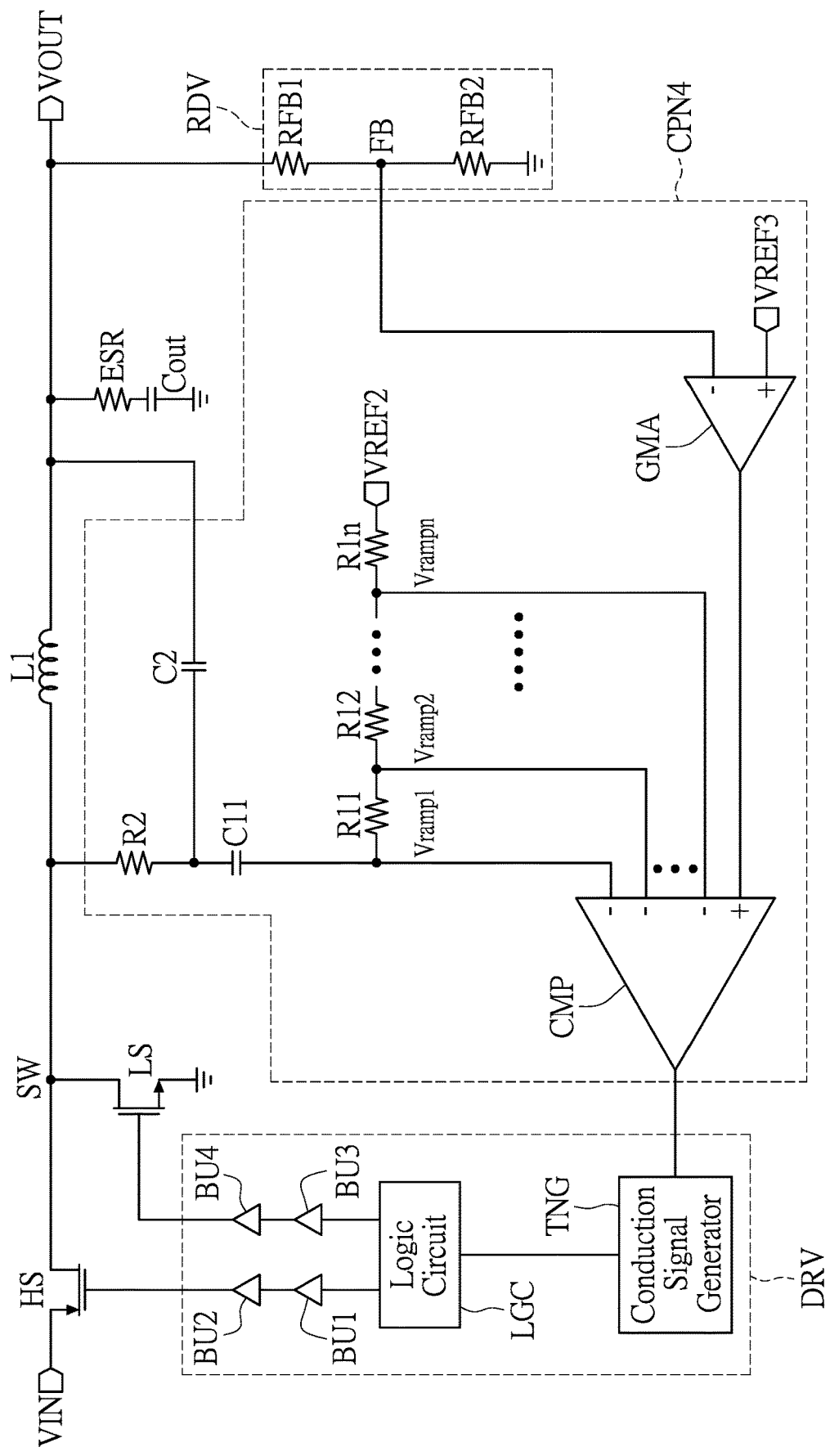
FIG. 6 is a circuit diagram of a power converter having a multi-slope compensation mechanism according to a fourth embodiment of the present disclosure.

Reference is made to FIG. 6, which is a circuit diagram of a power converter having a multi-slope compensation mechanism according to a fourth embodiment of the present disclosure.

A difference between the first and fourth embodiments are that, configurations of the plurality of first resistors R11 to R1n and the first capacitor C11 of the multi-slope compensation circuit CPN4 of the fourth embodiment are different from that of the plurality of first resistors R11 to R1$n$ and the plurality of first capacitors C11 to C1$n$ of the multi-slope compensation circuit CPN1 of the first embodiment.

As shown in FIG. 6, the multi-slope compensation circuit CPN4 of the fourth embodiment of the present disclosure may include the plurality of first resistors R11 to R1$n$, the first capacitor C11, the second resistor R2 and the comparator CMP. If necessary, the multi-slope compensation circuit CPN4 may further include one or both of the second capacitor C2 and the error amplifier GMA as shown in FIG. 6, but the present disclosure is not limited thereto.

As shown in FIG. 6, the first resistors R11 to R1$n$ are connected in series to each other. That is, the second terminal of the first resistor R11 is connected to the first terminal of the first resistor R12, the second terminal of the first resistor R12 is connected to the first terminal of the first resistor R13, the second terminal of the first resistor R13 is connected to the first terminal of the first resistor R14, and so on. The second terminal of the first resistor R1$n$ is coupled to the second reference voltage VREF2.

The first terminal of the first resistor R11 is connected to the second terminal of the first capacitor C11. The first terminal of the first capacitor C11 is connected to the second terminal of the second resistor R2 and the second terminal of the second capacitor C2. The first terminal of the second resistor R2 is connected to the first terminal of the inductor L1. The first terminal of the second resistor R2 may be connected to the node SW between the second terminal of the high-side switch HS and the first terminal of the low-side switch LS. The first terminal of the second capacitor C2 is connected to the second terminal of the inductor L1.

It is worth noting that, the first terminals of the plurality of first resistors R11 to R1$n$ are respectively connected to the plurality of first input terminals such as the inverting input terminals of the comparator CMP. The second input terminal such as the non-inverting input terminal of the comparator CMP is connected to the output terminal of the error amplifier GMA. The comparator CMP selects one of the plurality of ramp voltages Vramp1 to Vramp$n$. The second input terminal such as the non-inverting input terminal of the comparator CMP receives the error amplified signal from the error amplifier GMA. The comparator CMP compares the one of the plurality of ramp voltages Vramp1 to Vramp$n$ with the voltage of the error amplified signal to output the comparison signal. The driver circuit DRV drives the high-side switch HS and the low-side switch LS according to the comparison signal from the comparator CMP.

When the instantaneous transient change in the load and the current required for the load that is the heavy load are larger, the comparator CMP selects one of the plurality of ramp voltages Vramp1 to Vramp$n$ that has the smaller amplitude. The comparator CMP compares the one of the plurality of ramp voltages Vramp1 to Vramp$n$ that has the smaller amplitude with the voltage of the error amplified signal to more quickly output the pulse waves of the comparison signal. Therefore, the output voltage VOUT of the output terminal of the power converter that supplies the power required for the load is more quickly increased, thereby effectively preventing the output voltage VOUT of the output terminal of the power converter from undershooting to the too low voltage.

The other descriptions of the fourth embodiment are the same as that of the first embodiment and thus are not repeated herein.

Beneficial Effects of the Embodiments

In conclusion, the present disclosure provides the power converter having the multi-slope compensation mechanism.

The power converter of the present disclosure provides the plurality of ramp voltages. The power converter of the present disclosure selects one of the plurality of ramp voltages according to the instantaneous transient change in the load. The one of the plurality of ramp voltages is compared with the sensed voltage of the power converter of the present disclosure. As a result, the power converter of the present disclosure has good transient response. It is worth noting that, when the instantaneous transient change in the load and the current required for the load are larger, the comparator selects one of the plurality of ramp voltages that has the smaller amplitude. The comparator compares the one of the plurality of ramp voltages that has the smaller amplitude with the sensed voltage of the power converter to more quickly turn on the high-side switch. Therefore, the output voltage of the power converter that supplies the power required for the load is more quickly increased, thereby effectively preventing the circuit components of the power converter of the present disclosure from being damaged due to the undershoot of the output voltage of the power converter.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A power converter having a multi-slope compensation mechanism, comprising:
 a high-side switch, wherein a first terminal of the high-side switch is coupled to an input voltage;
 a low-side switch, wherein a first terminal of the low-side switch is connected to a second terminal of the high-side switch, a second terminal of the low-side switch is grounded, a node between the first terminal of the low-side switch and the second terminal of the high-side switch is connected to a first terminal of an inductor, a second terminal of the inductor is connected to a first terminal of an output capacitor, and a second terminal of the output capacitor is grounded;
 a multi-slope compensation circuit, including:
  a plurality of first capacitors each having a first terminal and a second terminal;
  a comparator, wherein a plurality of first input terminals of the comparator are respectively connected to the second terminals of the plurality of first capacitors, and a second input terminal of the comparator is coupled to a first reference voltage;
  a plurality of first resistors, wherein first terminals of the plurality of first resistors are respectively connected to the plurality of first input terminals of the comparator, the first terminals of the plurality of first resistors are respectively connected to the second terminals of the plurality of first capacitors, and a second terminal of each of the plurality of first resistors is coupled to a second reference voltage; and a second resistor, wherein a first terminal of the second resistor is connected to the first terminal of the inductor, and a second terminal of the second resistor is connected to the first terminal of each of the plurality of first resistors; and a driver circuit, wherein an input terminal of the driver circuit is connected to an output terminal of the comparator, and an output terminal of the driver circuit is connected to a control terminal of the high-side switch and a control terminal of the low-side switch.

2. The power converter according to claim 1, wherein the multi-slope compensation circuit further includes:

a second capacitor, wherein a first terminal of the second capacitor is connected to the second terminal of the inductor, and a second terminal of the second capacitor is connected to the first terminal of each of the plurality of first capacitors.

3. The power converter according to claim 1, wherein the multi-slope compensation circuit further includes:

an error amplifier, wherein a first input terminal of the error amplifier is connected to the second terminal of the inductor, a second input terminal of the error amplifier is coupled to a third reference voltage, an output terminal of the error amplifier is connected to the second input terminal of the comparator, and a voltage of an output terminal of the error amplifier is the first reference voltage.

4. The power converter according to claim 3, further comprising:

a voltage driver circuit, wherein an input terminal of the voltage driver circuit is connected to the second terminal of the inductor, and an output terminal of the voltage driver circuit is connected to the first input terminal of the error amplifier.

5. The power converter according to claim 4, wherein the voltage driver circuit includes a first voltage driving resistor and a second voltage driving resistor, a first terminal of the first voltage driving resistor is connected to the second terminal of the inductor, a second terminal of the first voltage driving resistor is connected to a first terminal of the second voltage driving resistor, a node between the second terminal of the first voltage driving resistor and the first terminal of the second voltage driving resistor is connected to the first input terminal of the error amplifier, and a second terminal of the second voltage driving resistor is grounded.

6. The power converter according to claim 1, wherein the second terminal of each of the plurality of first resistors is connected to the second terminal of the inductor, and a voltage of the second terminal of the inductor is the second reference voltage.

7. The power converter according to claim 6, further comprising:

a voltage driver circuit, wherein an input terminal of the voltage driver circuit is connected to the second terminal of the inductor, and an output terminal of the voltage driver circuits is connected to the second terminal of each of the plurality of first resistors.

8. The power converter according to claim 7, wherein the voltage driver circuit includes a first voltage driving resistor and a second voltage driving resistor, a first terminal of the first voltage driving resistor is connected to the second terminal of the inductor, a second terminal of the first voltage driving resistor is connected to a first terminal of the second voltage driving resistor, a node between the second terminal of the first voltage driving resistor and the first terminal of the second voltage driving resistor is connected to the second terminal of each of the plurality of first resistors, a second terminal of the second voltage driving resistor is grounded, and a voltage of the first terminal of the second voltage driving resistor is the second reference voltage.

9. The power converter according to claim 1, wherein the second input terminal of the comparator is connected to the second terminal of the inductor, and a voltage of the second terminal of the inductor is the first reference voltage.

10. The power converter according to claim 9, further comprising:

a voltage driver circuit, wherein an input terminal of the voltage driver circuit is connected to the second terminal of the inductor, and an output terminal of the voltage driver circuits is connected to the second input terminal of the comparator.

11. The power converter according to claim 10, wherein the voltage driver circuit includes a first voltage driving resistor and a second voltage driving resistor, a first terminal of the first voltage driving resistor is connected to the second terminal of the inductor, a second terminal of the first voltage driving resistor is connected to a first terminal of the second voltage driving resistor, a node between the second terminal of the first voltage driving resistor and the first terminal of the second voltage driving resistor is connected to the second terminal of the second input terminal of the comparator, a second terminal of the second voltage driving resistor is grounded, and a voltage of the first terminal of the second voltage driving resistor is the first reference voltage.

12. The power converter according to claim 1, wherein the driver circuit includes a conduction signal generator, the conduction signal generator is connected to the output terminal of the comparator, the control terminal of the high-side switch and the control terminal of the low-side switch, and the conduction signal generator is configured to output a high-side conduction signal to the control terminal of the high-side switch and to output a low-side conduction signal to the control terminal of the low-side switch according to a comparison signal from the comparator.

13. The power converter according to claim 12, wherein the driver circuit further includes a logic circuit, the logic circuit is connected to the conduction signal generator, the control terminal of the high-side switch and the control terminal of the low-side switch, the logic circuit is configured to output a first logic signal to the control terminal of the high-side switch according to the high-side conduction signal, and the logic circuit is configured to output a second logic signal to the control terminal of the low-side switch according to the low-side conduction signal.

14. The power converter according to claim 13, wherein the driver circuit further includes a first buffer circuit, an input terminal of the first buffer circuit is connected to an output terminal of the logic circuit, and an output terminal of the first buffer circuit is connected to the control terminal of the high-side switch.

15. The power converter according to claim 14, wherein the driver circuit further includes a second buffer circuit, an input terminal of the second buffer circuit is connected to the output terminal of the logic circuit, and an output terminal of the second buffer circuit is connected to the control terminal of the low-side switch.

16. A power converter having a multi-slope compensation mechanism, comprising:

a high-side switch, wherein a first terminal of the high-side switch is coupled to an input voltage;

a low-side switch, wherein a first terminal of the low-side switch is connected to a second terminal of the high-side switch, a second terminal of the low-side switch is grounded, a node between the first terminal of the low-side switch and the second terminal of the high-side switch is connected to a first terminal of an inductor, a second terminal of the inductor is connected to a first terminal of an output capacitor, and a second terminal of the output capacitor is grounded;

a multi-slope compensation circuit, including:
- a first capacitor having a first terminal and a second terminal;
- a comparator having a plurality of first input terminals and a second input terminal, wherein the second input terminal of the comparator is coupled to a first reference voltage;
- a plurality of first resistors connected to each other in series, wherein first terminals of the plurality of first resistors are respectively connected to the plurality of first input terminals of the comparator, one of the plurality of first resistors is further connected to the second terminal of the first capacitor, another one of the plurality of first resistors is coupled to a second reference voltage, and a second terminal of each of the plurality of first resistors except for the another one of the plurality of first resistors is connected to the first terminal of one of the plurality of first resistors that is disposed adjacent thereto; and
- a second resistor, wherein a first terminal of the second resistor is connected to the first terminal of the inductor, and a second terminal of the second resistor is connected to the first terminal of the first capacitor; and a driver circuit, wherein an input terminal of the driver circuit is connected to an output terminal of the comparator, and an output terminal of the driver circuit is connected to a control terminal of the high-side switch and a control terminal of the low-side switch.

17. The power converter according to claim 16, wherein the multi-slope compensation circuit further includes:
a second capacitor, wherein a first terminal of the second capacitor is connected to the second terminal of the inductor, and a second terminal of the second capacitor is connected to the first terminal of the first capacitor.

18. The power converter according to claim 16, wherein the multi-slope compensation circuit further includes:
an error amplifier, wherein a first input terminal of the error amplifier is connected to the second terminal of the inductor, a second input terminal of the error amplifier is coupled to a third reference voltage, an output terminal of the error amplifier is connected to the second input terminal of the comparator, and a voltage of an output terminal of the error amplifier is the first reference voltage.

19. The power converter according to claim 18, further comprising:
a voltage driver circuit, wherein an input terminal of the voltage driver circuit is connected to the second terminal of the inductor, and an output terminal of the voltage driver circuit is connected to the first input terminal of the error amplifier.

20. The power converter according to claim 19, wherein the voltage driver circuit includes a first voltage driving resistor and a second voltage driving resistor, a first terminal of the first voltage driving resistor is connected to the second terminal of the inductor, a second terminal of the first voltage driving resistor is connected to a first terminal of the second voltage driving resistor, a node between the second terminal of the first voltage driving resistor and the first terminal of the second voltage driving resistor is connected to the first input terminal of the error amplifier, and a second terminal of the second voltage driving resistor is grounded.

* * * * *